(12) United States Patent
Morita et al.

(10) Patent No.: US 11,807,751 B2
(45) Date of Patent: Nov. 7, 2023

(54) RESIN COMPOSITION AND MOLDING METHOD THEREOF

(71) Applicant: Hemicellulose Ltd., Kanagawa (JP)

(72) Inventors: Seiji Morita, Tokyo (JP); Jin Nasukawa, Tokyo (JP); Kenichi Sato, Tokyo (JP); Laksmi Kusumawardhani, Tokyo (JP)

(73) Assignee: Hemicellulose Ltd., Kanagawa (JP)

( * ) Notice: Subject to any disclaimer, the term of this patent is extended or adjusted under 35 U.S.C. 154(b) by 389 days.

(21) Appl. No.: 16/704,226

(22) Filed: Dec. 5, 2019

(65) Prior Publication Data

US 2020/0270430 A1    Aug. 27, 2020

(30) Foreign Application Priority Data

Feb. 22, 2019    (JP) .................................. 2019-030378

(51) Int. Cl.

| | |
|---|---|
| *C08L 5/14* | (2006.01) |
| *B29C 45/18* | (2006.01) |
| *B29C 45/56* | (2006.01) |
| *B29C 45/73* | (2006.01) |
| *B29C 45/74* | (2006.01) |
| *C08L 23/06* | (2006.01) |
| *C08L 23/12* | (2006.01) |
| *C08L 33/12* | (2006.01) |
| *C08L 67/02* | (2006.01) |

(Continued)

(52) U.S. Cl.
CPC ............ *C08L 5/14* (2013.01); *B29C 45/1816* (2013.01); *B29C 45/561* (2013.01); *B29C 45/7337* (2013.01); *B29C 45/74* (2013.01); *C08L 23/06* (2013.01); *C08L 23/12* (2013.01); *C08L 33/12* (2013.01); *C08L 67/02* (2013.01); *C08L 67/04* (2013.01); *C08L 69/00* (2013.01); *B29C 2945/76361* (2013.01); *B29K 2005/00* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,357,616 | A | * | 11/1982 | Terao ..................... | G11B 7/243 347/264 |
| 6,124,384 | A | * | 9/2000 | Shiraishi ................. | C08L 67/06 524/72 |

(Continued)

OTHER PUBLICATIONS

Structure Search—16704226—EIC search (Year: 2022).*

(Continued)

*Primary Examiner* — Peter A Salamon
(74) *Attorney, Agent, or Firm* — Alix, Yale & Ristas, LLP

(57) ABSTRACT

A resin composition for molding having excellent heat resistance, hardness, cost-effectiveness and biodegradability is provided by using amorphous resin material components extracted from plant-derived wood. The resin composition includes a first resin including a hemicellulose or a hemicellulose derivative and a second resin including polymethylmethacrylate (PMMA, acrylic), polycarbonate (PC), cyclo olefin polymer (COP), cyclo olefin copolymer (COC), polypropylene (PP), polyethylene (PE), polyethylene terephthalate (PET), or polystyrene (PS) and has excellent injection moldability.

13 Claims, 2 Drawing Sheets

(51) Int. Cl.
*C08L 67/04* (2006.01)
*C08L 69/00* (2006.01)

(56) References Cited

U.S. PATENT DOCUMENTS

| | | | | |
|---|---|---|---|---|
| 6,164,588 A | * | 12/2000 | Jacobsen | B29C 43/16 |
| | | | | 242/610.6 |
| 6,346,165 B1 | * | 2/2002 | Markessini | B27N 3/28 |
| | | | | 162/99 |
| 2008/0090984 A1 | * | 4/2008 | Namikoshi | C08G 63/06 |
| | | | | 536/124 |
| 2011/0190402 A1 | * | 8/2011 | Linhardt | C09D 101/02 |
| | | | | 106/163.01 |
| 2020/0270430 A1 | * | 8/2020 | Morita | C08L 33/12 |

OTHER PUBLICATIONS

Enhanced crystallization of poly(d-lactide) by xylan esters, Fundadore et al. Polymer Degradation and Stability, 98 (2013) 2482-2487 hereinafter "Fundadore" (Year: 2013).*

Synthesis and characterization of xylan esters, Iwata et al, Polymer, 53 (2012), 3885-3893, hereinafter "Iwata" (Year: 2012).*

* cited by examiner

RESIN COMPOSITION AND MOLDING METHOD THEREOF

TECHNICAL FIELD

The present invention relates to a resin composition and injection molding method thereof. In particular, the present invention relates to a resin composition for molding having biodegradability and molding method thereof.

BACKGROUND

Chemically synthesized plastics, such as PP, PE, PET, PC, PMMA, PS, COP, and COC, have been used as resin materials for molding. Although these chemically synthesized plastics produce carbon dioxide and pose environmental pollution problems, they are currently being used with such problems are nearly neglected when synthesized plastics are used.

Under such circumstances, resin compositions have been developed so that they do not produce carbon dioxide during preparation thereof and are made of a component of a natural material, such as a plant. Also, biodegradable resin compositions have been developed so that they are biodegraded into low-molecular compounds not to have adverse effects on the environment by microorganisms. Examples of such a plant-derived, biodegradable resin composition include polylactic acid (PLA). A molded product made of polylactic acid is disclosed in Japanese Unexamined Patent Application Publication No. 2016-179694.

SUMMARY

PLA is made from corn or sugarcane and therefore produces less $CO_2$. However, it requires many preparation processes and high preparation cost. Also, PLA is a material that biodegrades only at high temperatures of 50 degrees Celsius or more. For this reason, PLA cannot exhibit biodegradability when disposed of in the natural environment. Also, PLA is less heat resistant and therefore a molded product made of PLA, for example, a drink container such as a cup, is deformed when hot water is poured thereinto. Also, a molded product made of PLA has less strength and therefore is cracked, damaged, or broken when it falls or is bent or pressed. When producing a molded product from PLA by injection molding, a longer molding cycle time is required, or a molding failure is more likely to occur due to poor fluidity of PLA. These problems may lead to unsuccessful mass production of molded products. In this way, conventional resin compositions including PLA is problematic in terms of heat resistance, hardness, cost-effectiveness, and biodegradability.

The present inventors conducted intensive research and, as a result, here provide a resin composition for molding having excellent heat resistance, hardness, cost-effectiveness, and biodegradability by using an amorphous resin material component extracted from plant-derived wood. The present inventors also provide a molding method of this resin composition.

A resin composition for molding of the present embodiment includes a first resin that is derived from a plant and has the following structural formula (Chemical Formula 1).

[Chemical Formula 1]

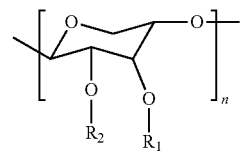

The resin composition for molding preferably includes a second resin having the following structural formula (Chemical Formula 2).

[Chemical Formula 2]

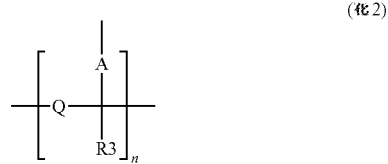

The resin composition for molding may include a second resin including one of polycarbonate (PC), cyclo olefin polymer (COP), cyclo olefin copolymer (COC), polypropylene (PP), polyethylene (PE), polyethylene terephthalate (PET), polystyrene (PS), polylactic acid (PLA), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (PTFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polyamide (nylon) (PA), Teflon®, FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), and polylactic acid (PLA), or two or more of these substances. In this case, the resin composition preferably includes 30 to 60 percent by weight of the first resin and 40 to 70 percent by weight of the second resin.

Wood powder or wood pellets, bamboo powder or bamboo pellets, or grass powder or grass pellets obtained by freezing and crushing wood, bamboo, or grass; or paper powder or paper pellets obtained by freezing and crushing paper may be kneaded with the first resin, or may be kneaded with the first and second resins. As these materials are very inexpensive, the cost of resin pellets and the price of molded products are expected to be reduced. When wood powder or wood pellets, bamboo powder or bamboo pellets, grass powder or grass pellets, or paper powder or paper pellets is directly mixed with the second resin, the resin composition decreases in heat resistance, strength, and fluidity. On the other hand, by kneading those materials with the first resin, the resin composition improves in heat resistance, strength, and fluidity and obtains biodegradability. In this case, it is preferred to knead those materials with the 30 to 60 percent by weight of the first resin.

A resin composition molding method of the present embodiment includes a step of charging a resin composition into a resin injector with the resin composition solidified, a step of liquidizing the resin composition in the resin injector by heating and compressing the resin composition, a step of injecting the liquidized resin composition from the resin injector into a mold by pressing the resin composition, and a step of cooling and solidifying the resin composition in the mold and extracting a molded product from the mold. The resin composition molding method preferably further includes a step of introducing a gas into the liquidized resin composition and dispersing the gas in the resin composition.

The resin composition of the present invention has excellent heat resistance, hardness, cost-effectiveness, and biodegradability.

DETAILED DESCRIPTION

Hemicellulose and Hemicellulose Derivatives

Figure 1A:
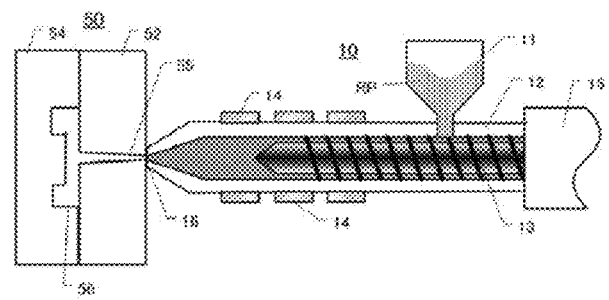
FIGS. 1A to 1C are concept drawings that show production of an injection-molded product using an injection molding machine and a mold (without a gas)

A resin composition according to the present embodiment includes a plant-derived resin component. This resin component is one of the main components of a tree. That is, a tree includes three main components: cellulose, hemicellulose, and lignin. A first resin of the present embodiment includes a hemicellulose as a component. A hemicellulose is amorphous and has very high uniformity. A melted liquid hemicellulose has high fluidity and is suitable as a material for injection molding. Cellulose is a fibrous material having high crystallinity and is not suitable as a main component of a material for injection molding. Lignin is a material having high crystallinity and less fluidity and therefore is not suitable as a main component of a material for injection molding. A hemicellulose alone is an amorphous material, and a liquidized hemicellulose can uniformly flow through a cylinder during injection molding.

Hemicelluloses include complex polysaccharides, such as mannan, glucan, xylan, and xyloglucan. The hemicellulose of the present embodiment may be any of these substances and may contain a small amount of cellulose or a small amount of lignin. Among hemicelluloses, xylan is preferably used. A typical hemicellulose has a molecular weight of (weight average molecular weight Mw) 1,000 to 100,000. If a hemicellulose having a molecular weight of 30,000 to 100,000 is injection-molded, a molded product having good strength is obtained.

A hemicellulose has good biodegradability. A hemicellulose biodegrades at a higher rate than cellulose and lignin and favorably biodegrades at low to high temperatures, for example, at a low temperature of 5 degrees Celsius. A hemicellulose is biodegraded by microorganisms even at ordinary temperature and becomes water and carbon dioxide after three months. For example, when buried in soil, a hemicellulose is biodegraded by microorganisms in soil. A hemicellulose is also biodegraded by microorganisms in seawater. A hemicellulose is a material in harmony with the environment.

A hemicellulose is a component of wood and therefore chemical synthesis is not required to obtain a hemicellulose. That is, a hemicellulose does not produce carbon dioxide, which occurs when chemically synthesizing a raw material, and plant-derived wood consumes carbon dioxide by photosynthesis. Use of a hemicellulose as the first resin of the composition for injection molding reduces occurrence of carbon dioxide.

The basic structure of a hemicellulose as the first resin has the following structural formula (Chemical Formula 1).

[Chemical Formula 1]

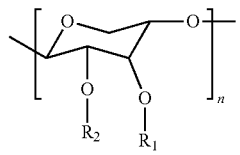

(化1)

R1 and R2 each represent a substituent group. R1 and R2 are each hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, or the like, but are not limited thereto. R1 and R2 may be each a substituent group having any of these substances in the structure. R1 and R2 may be each fluorine, bromine, chlorine, iodine, or the like, or may be each a substituent group having any of these substances in the structure. R1 and R2 may each be an ionized substituent group, such as a cation or anion, that forms an ionic liquid structure, or may each be a substituent group having such a substance in the structure. R1 and R2 may be different substituent groups.

A hemicellulose having such a basic structure provides the resin composition with biodegradability, as well as heat resistance, strength, fluidity, and transparency. Such a resin composition can be injection-molded, and an injection-molded product has biodegradability, as well as good heat resistance, strength, fluidity, and transparency. n is an integer greater than or equal to 2. As will be described later, a hemicellulose component extracted from a wood chip includes hydrogen as R1 and R2 and is called a "hemicellulose." A hemicellulose has high hydrophilicity and therefore easily captures moisture. A molded product including a hemicellulose, which has high water absorbency, may be unpreferable, since the size, volume, or weight thereof is more likely to vary with time, depending on the application. Also, such a molded product decreases in strength, transparency, or heat resistance, depending on the application. To solve these problems associated with water absorbency, it is preferred to change R in the molecule of the hemicellulose to a substituent group as description above, that is, a substituent group, such as an acetyl group, an acetonyl group, or an ionized substituent group. Hemicelluloses including various substituent groups other than hydrogen are called "hemicellulose derivatives." A typical hemicellulose derivative includes acetyl groups as R1 and R2.

Preparation of Hemicellulose and Hemicellulose Derivatives

Fragments obtained by crushing wood into small sizes are called wood chips. When these wood chips are put into an aqueous solution containing butanol and heated, this solution is separated into the butanol/lignin phase and the water/hemicellulose phase. Cellulose precipitates as a solid. By removing water from the water/hemicellulose phase, hemicellulose powder can be obtained. This hemicellulose powder has a basic structure represented by a structural formula in which R1 and R2 are hydrogen. This hemicellulose powder has high hydrophilicity and therefore easily captures moisture. A molded product including this hemicellulose powder having high water absorbency is more likely to change in size, volume, or weight with time, as well as may decrease in strength, transparency, or heat resistance.

For this reason, a hemicellulose derivative is prepared by changing R1 and R2 in the structural formula of the hemicellulose powder from hydrogen to acetyl groups so that an acetylation reaction occurs in the hemicellulose powder. A hemicellulose derivative may be prepared by changing R1 and R2 in the structural formula of the hemicellulose powder from hydrogen to substituent groups, such as acetonyl groups, propenyl groups, or carboxyl groups, rather than acetyl groups so that a corresponding chemical reaction occurs in the hemicellulose powder. The preparation of such a hemicellulose derivative was performed using a conventional sugar derivative preparation technology. This sugar derivative preparation technology is a technology proposed by Yamagata University, Nippon Kayaku Co., Ltd., HORIBA STEC, Co., Ltd., Kobe Natural Products Chemical Co., Ltd., or Hayashibara Co., Ltd.

Resin Composition for Molding

The hemicellulose or hemicellulose derivative, which is the first resin, serves as a resin composition or resin pellets for injection molding on its own. On the other hand, the hemicellulose or hemicellulose derivative, which is the first resin, may be mixed with a second resin. In this case, a resin composition for injection molding is obtained by mixing the powdery hemicellulose or hemicellulose derivative with powder, pellets, or the like of the second resin and charging the mixture into an extruder/kneader.

The first resin and second resin are melted and kneaded in the extruder/kneader, and the kneaded resin composition is extruded in the form of a tube from the nozzle of the extruder/kneader. The tubular resin is cut into resin pellets made of the resin composition using a pelletizer. The resin pellets are resin strips having a diameter of 0.2 to 3 mm and a length of 0.2 to 5 mm.

The second resin is polycarbonate (PC), cyclo olefin polymer (COP), cyclo olefin copolymer (COC), polypropylene (PP), polyethylene (PE), polyethylene terephthalate (PET), polystyrene (PS), polylactic acid (PLA), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (10), fluorocarbon resin (FR), tetrafluoroethylene (PTFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polyamide (nylon) (PA), Teflon®, FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), or the like, but is not limited to these resins. Or, the second resin may be two or more of these resins. Wood powder or wood pellets, bamboo powder or bamboo pellets, or grass powder or grass pellets obtained by freezing and crushing wood, bamboo, or grass, or paper powder or paper pellets obtained by freezing and crushing paper may be kneaded with the first resin, or may be kneaded with the first and second resins. These materials are very inexpensive and therefore the kneaded resin pellets can be produced at lower cost and are expected to be sold at lower price. If the wood powder or wood pellets, bamboo powder or bamboo pellets, grass powder or grass pellets, or paper powder or paper pellets is directly mixed with the second resin, the heat resistance, strength, and fluidity decreases. On the other hand, by kneading those materials with the first resin, the resin composition improves in heat resistance, strength, and fluidity and obtains biodegradability.

A resin having the following structural formula (Chemical Formula 2) may be mixed as the second resin. Examples of such a resin include polymethylmethacrylate (PMMA, acrylic).

[Chemical Formula 2]

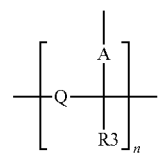

In this formula, R3 represents a substituent group and is hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, or the like, but is not limited thereto. R3 may be fluorine, bromine, chlorine, iodine, or the like, or may be a substituent group having any of these substances in the structure. R3 may also be an ionized substituent group, such as a cation or anion, that forms an ionic liquid structure. R3 may also be a substituent group having any of the above substances in the structure.

A and Q each independently represent a single bond or a linking group. Examples of Q which is a linking group include groups, such as an alkylene group, —O—, —NH2—, and an carbonyl group. Examples of A which is a linking group include groups, such as an alkylene group, —O—, and —C(=O)O—. n is an integer equal to or greater than 2, multiple R3 in the above structural formula may be the same or different, multiple Q may also be the same or different, and A and Q may be the same or different. The second resin has a molecular weight of (weight average molecular weight Mw) 1,000 to 10,000,000. If the second resin has a molecular weight of 30,000 to 1,000,000, an injection-molded product having good strength is obtained.

The resin pellets made of the resin composition including the first and second resins are charged into an injection molding machine, and a molded product having a shape corresponding to a mold is obtained. When the molded product made of the resin composition of the present embodiment enters soil or seawater, the first resin, which is mixed with the second resin in the resin composition at a molecular level, is biodegraded by microorganisms and thus the second resin is also biodegraded at a molecular level. In this way, biodegradation proceeds. In other words, the first resin performs a function of providing the second resin with biodegradability, which had never been predicted until this invention even by the present inventors. This is a finding that those skilled in the art involved in plastics, bioplastics, or biodegradable plastics cannot easily conceive of. And this is a finding that the experiments in Examples of the present invention demonstrated. The present inventors believe that when the molecules of the first resin are inserted between the molecules of the second resin, biodegradation of the first resin facilitates biodegradation of the molecules of the second resin.

The present inventors also found that the resin composition including the first and second resins mixed at a molecular level has higher heat resistance, strength, fluidity, transcription properties, and optical properties than the resin composition including the first resin alone and had never predicted this finding. This is a finding that those skilled in the art involved in plastics, bioplastics, or biodegradable plastics cannot easily conceive of. And this is a finding that the experiments in Examples of the present invention demonstrated. The present inventors believe that the resin composition became a material that is stable even at high temperatures, stronger, and optically uniform, due to the complicated intertwining between the molecules of the first resin and the molecules of the second resin and thus improved in total light transmittance and birefringence. The present inventors also believe that the first resin functioned as a solvent when the first resin melted and thus the resin composition decreased in viscosity and improved in fluidity and transcription properties.

Molded Product by Light Molding

First Embodiment

In a first embodiment, resin pellets were made of a resin composition including 100 percent by weight of a hemicellulose derivative. The hemicellulose derivative included acetyl groups as R1 and R2 in the above structural formula. The hemicellulose derivative had a molecular weight (weight average molecular weight Mw) of 100,000. Samples of a dumbbell piece, a strip piece, a disk substrate, a cup, and a flat plate were produced from the resin pellets by light molding. As a comparative example, samples of a dumbbell piece, a strip piece, a disk substrate, a cup, and a flat plate were produced from resin pellets including 100 percent by weight of PLA (polylactic acid) (having a molecular weight (weight average molecular weight Mw) of 100,000). These samples were evaluated for heat-resistant temperature, tensile strength, bending strength, fluidity, transcription properties, total light transmittance, birefringence phase difference, impurity concentration, and biodegradation rate. The evaluation results are shown in Table 1.

TABLE 1

| EVALUATION ITEM | TARGET VALUE | FIRST EMBODIMENT HEMICELLULOSE | COMPARATIVE EMBODIMENT PLA | MEASUREMENT METHOD | |
|---|---|---|---|---|---|
| HEAT-RESISTANT TEMPERATURE (° C.) | 120° C. OR MORE | 180 | 58 | ISO75 | |
| TENSILE STRENGTH (MPa) | 80 OR MORE | 90 | 63 | ISO527 | |
| BENDING STRENGTH (MPa) | 150 OR MORE | 158 | 106 | ISO178 | |
| FLUIDITY (g/10 min) | 15 OR MORE | 19 | 3.0 | ISO1133 | JIS K 7210 |

TABLE 1-continued

| EVALUATION ITEM | TARGET VALUE | FIRST EMBODIMENT HEMICELLULOSE | COMPARATIVE EMBODIMENT PLA | MEASUREMENT METHOD | |
|---|---|---|---|---|---|
| TRANSCRIPTION PROPERTIES (nm) | 100 nm OR LESS | 65 | 500,000 nm | SEM | |
| TOTAL LIGHT TRANSMITTANCE (%) | 92% OR MORE | 93 | 90 | ISO13468 | |
| BIREFRINGENCE PHASE DIFFERENCE (nm) | 30 nm OR LESS | 25 | 100 | Dr. Shenck | |
| METAL IMPURITY CONCENTRATION | 200 ppb OR LESS | 20 ppb | 100 ppm | ELEMENTAL ANALYSIS | |
| BIODEGRADATION RATE (%) | 90% OR MORE | 100 | 0% | ISO19679 | 27° C. 120 DAYS SEAWATER |

The samples including 100 percent by weight of the hemicellulose derivative exceeded the target values of heat-resistant temperature, tensile strength, bending strength, fluidity, transcription properties, total light transmittance, birefringence phase difference, impurity concentration, and biodegradation rate. Also, the samples including 100 percent by weight of the hemicellulose derivative were better in all the evaluation items than the samples including 100 percent by weight of PLA (polylactic acid). Note that in relation with seventh and eighth embodiments, resin pellets were made of a resin composition including 100 percent by weight of the hemicellulose derivative. Also, a hemicellulose derivative including acetyl groups as R1 and R2 is referred to as Example 10.

Second Embodiment

Next, each of resin compositions including a hemicellulose derivative and PMMA at different ratios was melted and kneaded in the extruder/kneader, and 3 kg of resin pellets was made of the kneaded resin composition. The hemicellulose derivative included acetyl groups as R1 and R2 in the above structural formula. PMMA had a molecular weight (weight average molecular weight Mw) of 120,000.

In Example 1, resin pellets were made of a resin composition including 10 percent by weight of the hemicellulose derivative and 90 percent by weight of PMMA.

In Example 2, resin pellets were made of a resin composition including 20 percent by weight of the hemicellulose derivative and 80 percent by weight of PMMA.

In Example 3, resin pellets were made of a resin composition including 30 percent by weight of the hemicellulose derivative and 70 percent by weight of PMMA.

In Example 4, resin pellets were made of a resin composition including 40 percent by weight of the hemicellulose derivative and 60 percent by weight of PMMA.

In Example 5, resin pellets were made of a resin composition including 50 percent by weight of the hemicellulose derivative and 50 percent by weight of PMMA.

In Example 6, resin pellets were made of a resin composition including 60 percent by weight of the hemicellulose derivative and 40 percent by weight of PMMA.

In Example 7, resin pellets were made of a resin composition including 70 percent by weight of the hemicellulose derivative and 30 percent by weight of PMMA.

In Example 8, resin pellets were made of a resin composition including 80 percent by weight of the hemicellulose derivative and 20 percent by weight of PMMA.

In Example 9, resin pellets were made of a resin composition including 90 percent by weight of the hemicellulose derivative and 10 percent by weight of PMMA.

Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2. Although the measurement methods are not described in Table 2, those are the same as the measurement methods in Table 1. The same applies to Tables 3 to 7 below.

TABLE 2

| EVALUATION ITEM | TARGET VALUE | SECOND EMBODIMENT | | | | | | | | |
|---|---|---|---|---|---|---|---|---|---|---|
| | | 1 | 2 | 3 | 4 | 5 | 6 | 7 | 8 | 9 |
| HEMICELLULOSE | — | 10 | 20 | 30 | 40 | 50 | 60 | 70 | 80 | 90 |
| PMMA | — | 90 | 80 | 70 | 60 | 50 | 40 | 30 | 20 | 10 |
| HEAT-RESISTANT TEMPERATURE (° C.) | 120° C. OR MORE | 121 | 126 | 201 | 250 | 250 | 205 | 180 | 170 | 170 |
| TENSILE STRENGTH (MPa) | 80 OR MORE | 81 | 83 | 94 | 98 | 98 | 94 | 90 | 90 | 88 |
| BENDING STRENGTH (MPa) | 150 OR MORE | 151 | 152 | 160 | 180 | 180 | 165 | 155 | 155 | 153 |
| FLUIDITY (g/10 min) | 15 OR MORE | 16 | 17 | 20 | 25 | 25 | 21 | 18 | 17 | 17 |
| TRANSCRIPTION PROPERTIES (nm) | 100 nm OR LESS | 90 | 90 | 60 | 50 | 50 | 55 | 60 | 70 | 70 |
| TOTAL LIGHT TRANSMITTANCE (%) | 92% OR MORE | 93 | 93 | 95 | 96 | 96 | 95 | 93 | 92 | 92 |

TABLE 2-continued

| EVALUATION ITEM | TARGET VALUE | SECOND EMBODIMENT | | | | | | | | |
|---|---|---|---|---|---|---|---|---|---|---|
| | | 1 | 2 | 3 | 4 | 5 | 6 | 7 | 8 | 9 |
| BIREFRINGENCE PHASE DIFFERENCE (nm) | 30 nm OR LESS | 28 | 28 | 20 | 10 | 10 | 20 | 28 | 28 | 29 |
| METAL IMPURITY CONCENTRATION | 200 ppb OR LESS | 100 ppb | 100 ppb | 80 ppb | 50 ppb | 30 ppb | 30 ppb | 30 ppb | 20 ppb | 20 ppb |
| BIODEGRADATION RATE (%) | 90% OR MORE | 91 | 92 | 95 | 100 | 100 | 98 | 95 | 95 | 98 |

The samples including PMMA as the second resin exceeded the target values of heat-resistant temperature, tensile strength, bending strength, fluidity, transcription properties, total light transmittance, birefringence phase difference, impurity concentration, and biodegradation rate, regardless the ratio of PMMA. In particular, the samples including 40% to 70 percent by weight of PMMA (60% to 30 percent by weight of the hemicellulose derivative) were excellent in heat-resistance temperature, tensile strength, bending strength, and biodegradation rate and showed better results in many evaluation items than even the samples including 100 percent by weight of the hemicellulose derivative.

Third Embodiment

Next, each of resin compositions including a hemicellulose derivative and PC at different ratios was melted and kneaded in the extruder/kneader, and 3 kg of resin pellets was made of the kneaded resin composition. The hemicellulose derivative included acetyl groups as R1 and R2 in the above structural formula. PC had a molecular weight (weight average molecular weight Mw) of PC of 140,000.

In Example 11, resin pellets were made of a resin composition including 10 percent by weight of the hemicellulose derivative and 90 percent by weight of PC.

In Example 12, resin pellets were made of a resin composition including 20 percent by weight of the hemicellulose derivative and 80 percent by weight of PC.

In Example 13, resin pellets were made of a resin composition including 30 percent by weight of the hemicellulose derivative and 70 percent by weight of PC.

In Example 14, resin pellets were made of a resin composition including 40 percent by weight of the hemicellulose derivative and 60 percent by weight of PC.

In Example 15, resin pellets were made of a resin composition including 50 percent by weight of the hemicellulose derivative and 50 percent by weight of PC.

In Example 16, resin pellets were made of a resin composition including 60 percent by weight of the hemicellulose derivative and 40 percent by weight of PC.

In Example 17, resin pellets were made of a resin composition including 70 percent by weight of the hemicellulose derivative and 30 percent by weight of PC.

In Example 18, resin pellets were made of a resin composition including 80 percent by weight of the hemicellulose derivative and 20 percent by weight of PC.

In Example 19, resin pellets were made of a resin composition including 90 percent by weight of the hemicellulose derivative and 10 percent by weight of PC. Note that Example 20 is an unassigned number.

Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3.

TABLE 3

| EVALUATION ITEM | TARGET VALUE | THIRD EMBODIMENT | | | | | | | | |
|---|---|---|---|---|---|---|---|---|---|---|
| | | 11 | 12 | 13 | 14 | 15 | 16 | 17 | 18 | 19 |
| HEMICELLULOSE | — | 10 | 20 | 30 | 40 | 50 | 60 | 70 | 80 | 90 |
| PC | — | 90 | 80 | 70 | 60 | 50 | 40 | 30 | 20 | 10 |
| HEAT-RESISTANT TEMPERATURE (° C.) | 120° C. OR MORE | 126 | 129 | 210 | 260 | 260 | 240 | 190 | 175 | 175 |
| TENSILE STRENGTH (MPa) | 80 OR MORE | 82 | 84 | 95 | 99 | 99 | 94 | 91 | 91 | 89 |
| BENDING STRENGTH (MPa) | 150 OR MORE | 150 | 151 | 158 | 170 | 170 | 164 | 151 | 151 | 151 |
| FLUIDITY (g/10 min) | 15 OR MORE | 15 | 16 | 19 | 24 | 24 | 22 | 19 | 16 | 16 |
| TRANSCRIPTION PROPERTIES (nm) | 100 nm OR LESS | 85 | 85 | 50 | 40 | 40 | 45 | 50 | 60 | 60 |
| TOTAL LIGHT TRANSMITTANCE (%) | 92% OR MORE | 92 | 92 | 94 | 95 | 95 | 94 | 93 | 92 | 92 |
| BIREFRINGENCE PHASE DIFFERENCE (nm) | 30 nm OR LESS | 30 | 30 | 25 | 20 | 20 | 22 | 29 | 29 | 29 |
| METAL IMPURITY CONCENTRATION | 200 ppb OR LESS | 160 ppb | 150 ppb | 90 ppb | 80 ppb | 80 ppb | 90 ppb | 60 ppb | 60 ppb | 30 ppb |
| BIODEGRADATION RATE (%) | 90% OR MORE | 92 | 93 | 96 | 100 | 100 | 96 | 95 | 95 | 94 |

The samples including PC as the second resin exceeded the target values of heat-resistant temperature, tensile strength, bending strength, fluidity, transcription properties, total light transmittance, birefringence phase difference, impurity concentration, and biodegradation rate, regardless the ratio of PC. In particular, the samples including 40% to 70 percent by weight of PC (60% to 30 percent by weight of the hemicellulose derivative) were excellent in the heat-resistance temperature, tensile strength, bending strength, and biodegradation rate and showed better results in many evaluation items than even the samples including 100 percent by weight of the hemicellulose derivative.

Fourth Embodiment

Next, each of resin compositions including a hemicellulose derivative and PE at different ratios was melted and kneaded in the extruder/kneader, and 3 kg of resin pellets was made of the kneaded resin composition. The hemicellulose derivative included acetyl groups as R1 and R2 in the above structural formula. PE had a molecular weight (weight average molecular weight Mw) of PE of 160,000.

In Example 21, resin pellets were made of a resin composition including 10 percent by weight of the hemicellulose derivative and 90 percent by weight of PE.

In Example 22, resin pellets were made of a resin composition including 20 percent by weight of the hemicellulose derivative and 80 percent by weight of PE.

In Example 23, resin pellets were made of a resin composition including 30 percent by weight of the hemicellulose derivative and 70 percent by weight of PE.

In Example 24, resin pellets were made of a resin composition including 40 percent by weight of the hemicellulose derivative and 60 percent by weight of PE.

In Example 25, resin pellets were made of a resin composition including 50 percent by weight of the hemicellulose derivative and 50 percent by weight of PE.

In Example 26, resin pellets were made of a resin composition including 60 percent by weight of the hemicellulose derivative and 40 percent by weight of PE.

In Example 27, resin pellets were made of a resin composition including 70 percent by weight of the hemicellulose derivative and 30 percent by weight of PE.

In Example 28, resin pellets were made of a resin composition including 80 percent by weight of the hemicellulose derivative and 20 percent by weight of PE.

In Example 29, resin pellets were made of a resin composition including 90 percent by weight of the hemicellulose derivative and 10 percent by weight of PE. Note that Example 30 is an unassigned number.

Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4.

TABLE 4

| EVALUATION ITEM | TARGET VALUE | FOURTH EMBODIMENT | | | | | | | | |
| --- | --- | --- | --- | --- | --- | --- | --- | --- | --- | --- |
| | | 21 | 22 | 23 | 24 | 25 | 26 | 27 | 28 | 29 |
| HEMICELLULOSE | — | 10 | 20 | 30 | 40 | 50 | 60 | 70 | 80 | 90 |
| PE | — | 90 | 80 | 70 | 60 | 50 | 40 | 30 | 20 | 10 |
| HEAT-RESISTANT TEMPERATURE (° C.) | 120° C. OR MORE | 120 | 121 | 140 | 150 | 150 | 145 | 130 | 130 | 130 |
| TENSILE STRENGTH (MPa) | 80 OR MORE | 81 | 83 | 85 | 86 | 86 | 88 | 85 | 85 | 84 |
| BENDING STRENGTH (MPa) | 150 OR MORE | 151 | 152 | 155 | 160 | 160 | 154 | 150 | 150 | 150 |
| FLUIDITY (g/10 min) | 15 OR MORE | 17 | 18 | 20 | 26 | 26 | 22 | 19 | 18 | 17 |
| TRANSCRIPTION PROPERTIES (nm) | 100 nm OR LESS | 500 | 450 | 100 | 90 | 90 | 80 | 100 | 100 | 100 |
| TOTAL LIGHT TRANSMITTANCE (%) | 92% OR MORE | 5 | 7 | 20 | 50 | 60 | 70 | 75 | 80 | 85 |
| BIREFRINGENCE PHASE DIFFERENCE (nm) | 30 nm OR LESS | — | — | — | — | — | — | — | 1000 | 1000 |
| METAL IMPURITY CONCENTRATION | 200 ppb OR LESS | 800 ppb | 800 ppb | 100 ppb | 90 ppb | 90 ppb | 80 ppb | 90 ppb | 80 ppb | 80 ppb |
| BIODEGRADATION RATE (%) | 90% OR MORE | 90 | 91 | 95 | 100 | 100 | 95 | 95 | 95 | 97 |

The samples including PE as the second resin were poor in total light transmittance and birefringence phase difference and therefore cannot be applied to optical components, or molded products that are required to be transparent. On the other hand, the samples including 70% or less by weight of PE exceeded the target values of heat-resistant temperature, tensile strength, bending strength, fluidity, transcription properties, impurity concentration, and biodegradation rate. In particular, the samples including 40% to 70 percent by weight of PE (60% to 30 percent by weight of the hemicellulose derivative) were excellent in heat-resistance temperature, tensile strength, bending strength, and biodegradation rate and showed better results in fluidity than even the samples including 100 percent by weight of the hemicellulose derivative.

Fifth Embodiment

Next, each of resin compositions including a hemicellulose derivative and PP at different ratios was melted and kneaded in the extruder/kneader, and 3 kg of resin pellets was made of the kneaded resin composition. The hemicellulose derivative included acetyl groups as R1 and R2 in the above structural formula. PP had a molecular weight (weight average molecular weight Mw) of PP of 200,000.

In Example 31, resin pellets were made of a resin composition including 10 percent by weight of the hemicellulose derivative and 90 percent by weight of PP.

In Example 32, resin pellets were made of a resin composition including 20 percent by weight of the hemicellulose derivative and 80 percent by weight of PP.

In Example 33, resin pellets were made of a resin composition including 30 percent by weight of the hemicellulose derivative and 70 percent by weight of PP.

In Example 34, resin pellets were made of a resin composition including 40 percent by weight of the hemicellulose derivative and 60 percent by weight of PP.

In Example 35, resin pellets were made of a resin composition including 50 percent by weight of the hemicellulose derivative and 50 percent by weight of PP.

In Example 36, resin pellets were made of a resin composition including 60 percent by weight of the hemicellulose derivative and 40 percent by weight of PP.

In Example 37, resin pellets were made of a resin composition including 70 percent by weight of the hemicellulose derivative and 30 percent by weight of PP.

In Example 38, resin pellets were made of a resin composition including 80 percent by weight of the hemicellulose derivative and 20 percent by weight of PP.

In Example 39, resin pellets were made of a resin composition including 90 percent by weight of the hemicellulose derivative and 10 percent by weight of PP. Note that Example 40 is an unassigned number.

Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 5.

ture, tensile strength, bending strength, fluidity, transcription properties, impurity concentration, and biodegradation rate. In particular, the samples including 40% to 70 percent by weight of PP were excellent in heat-resistant temperature, tensile strength, bending strength, and biodegradation rate and showed better results in many evaluation items than even the samples including 100 percent by weight of the hemicellulose derivative.

Sixth Embodiment

Next, each of resin compositions including a hemicellulose derivative and PET at different ratios was melted and kneaded in the extruder/kneader, and 3 kg of resin pellets was made of the kneaded resin composition. The hemicellulose derivative included acetyl groups as R1 and R2 in the above structural formula. PET had a molecular weight (weight average molecular weight Mw) of 300,000.

In Example 41, resin pellets were made of a resin composition including 10 percent by weight of the hemicellulose derivative and 90 percent by weight of PET.

In Example 42, resin pellets were made of a resin composition including 20 percent by weight of the hemicellulose derivative and 80 percent by weight of PET.

In Example 43, resin pellets were made of a resin composition including 30 percent by weight of the hemicellulose derivative and 70 percent by weight of PET.

In Example 44, resin pellets were made of a resin composition including 40 percent by weight of the hemicellulose derivative and 60 percent by weight of PET.

In Example 45, resin pellets were made of a resin composition including 50 percent by weight of the hemicellulose derivative and 50 percent by weight of PET.

In Example 46, resin pellets were made of a resin composition including 60 percent by weight of the hemicellulose derivative and 40 percent by weight of PET.

TABLE 5

| EVALUATION ITEM | TARGET VALUE | FIFTH EMBODIMENT | | | | | | | | |
|---|---|---|---|---|---|---|---|---|---|---|
| | | 31 | 32 | 33 | 34 | 35 | 36 | 37 | 38 | 39 |
| HEMICELLULOSE | — | 10 | 20 | 30 | 40 | 50 | 60 | 70 | 80 | 90 |
| PP | — | 90 | 80 | 70 | 60 | 50 | 40 | 30 | 20 | 10 |
| HEAT-RESISTANT TEMPERATURE (° C.) | 120° C. OR MORE | 122 | 128 | 210 | 250 | 250 | 210 | 190 | 160 | 160 |
| TENSILE STRENGTH (MPa) | 80 OR MORE | 80 | 80 | 88 | 91 | 91 | 92 | 85 | 85 | 84 |
| BENDING STRENGTH (MPa) | 150 OR MORE | 151 | 150 | 160 | 165 | 165 | 160 | 150 | 150 | 150 |
| FLUIDITY (g/10 min) | 15 OR MORE | 18 | 18 | 20 | 25 | 25 | 22 | 18 | 17 | 18 |
| TRANSCRIPTION PROPERTIES (nm) | 100 nm OR LESS | 500 | 500 | 98 | 90 | 90 | 96 | 100 | 100 | 95 |
| TOTAL LIGHT TRANSMITTANCE (%) | 92% OR MORE | 5 | 5 | 20 | 40 | 50 | 60 | 65 | 70 | 75 |
| BIREFRINGENCE PHASE DIFFERENCE (nm) | 30 nm OR LESS | — | — | — | — | — | — | — | — | — |
| METAL IMPURITY CONCENTRATION | 200 ppb OR LESS | 700 ppb | 700 ppb | 100 ppb | 90 ppb | 90 ppb | 90 ppb | 90 ppb | 80 ppb | 80 ppb |
| BIODEGRADATION RATE (%) | 90% OR MORE | 92 | 92 | 96 | 100 | 100 | 97 | 97 | 97 | 98 |

The samples including PP as the second resin were poor in total light transmittance and birefringence phase difference and therefore cannot be applied to optical components, or molded products that are required to be transparent. On the other hand, the samples including 70% or less by weight of PP exceeded the target values of heat-resistant tempera- In Example 47, resin pellets were made of a resin composition including 70 percent by weight of the hemicellulose derivative and 30 percent by weight of PET.

In Example 48, resin pellets were made of a resin composition including 80 percent by weight of the hemicellulose derivative and 20 percent by weight of PET.

In Example 49, resin pellets were made of a resin composition including 90 percent by weight of the hemicellulose derivative and 10 percent by weight of PET. Note that Example 50 is an unassigned number.

Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 6.

TABLE 6

| EVALUATION ITEM | TARGET VALUE | SIXTH EMBODIMENT | | | | | | | | |
|---|---|---|---|---|---|---|---|---|---|---|
| | | 41 | 42 | 43 | 44 | 45 | 46 | 47 | 48 | 49 |
| HEMICELLULOSE | — | 10 | 20 | 30 | 40 | 50 | 60 | 70 | 80 | 90 |
| PET | — | 90 | 80 | 70 | 60 | 50 | 40 | 30 | 20 | 10 |
| HEAT-RESISTANT TEMPERATURE (° C.) | 120° C. OR MORE | 145 | 150 | 210 | 260 | 260 | 250 | 190 | 180 | 170 |
| TENSILE STRENGTH (MPa) | 80 OR MORE | 84 | 84 | 95 | 99 | 99 | 94 | 92 | 92 | 90 |
| BENDING STRENGTH (MPa) | 150 OR MORE | 160 | 165 | 170 | 190 | 190 | 160 | 155 | 150 | 152 |
| FLUIDITY (g/10 min) | 15 OR MORE | 16 | 17 | 22 | 26 | 26 | 21 | 18 | 17 | 17 |
| TRANSCRIPTION PROPERTIES (nm) | 100 nm OR LESS | 100 | 100 | 50 | 40 | 40 | 60 | 70 | 75 | 80 |
| TOTAL LIGHT TRANSMITTANCE (%) | 92% OR MORE | 92 | 93 | 94 | 95 | 95 | 94 | 92 | 92 | 92 |
| BIREFRINGENCE PHASE DIFFERENCE (nm) | 30 nm OR LESS | 80 | 70 | 30 | 20 | 20 | 25 | 30 | 30 | 30 |
| METAL IMPURITY CONCENTRATION | 200 ppb OR LESS | 100 ppb | 100 ppb | 70 ppb | 40 ppb | 20 ppb | 40 ppb | 70 ppb | 70 ppb | 50 ppb |
| BIODEGRADATION RATE (%) | 90% OR MORE | 90 | 91 | 96 | 100 | 100 | 97 | 96 | 96 | 96 |

The samples including 80% or more by weight of PET as the second resin were poor in birefringence phase difference and therefore cannot be applied to optical components. On the other hand, the samples including 70% or less by weight of PET exceeded the target values of heat-resistant temperature, tensile strength, bending strength, fluidity, transcription properties, impurity concentration, and biodegradation rate. In particular, the samples including 40% to 70 percent by weight of PET were excellent in heat-resistant temperature, tensile strength, bending strength, and biodegradation rate and showed better results in many evaluation items than even the samples including 100 percent by weight of the hemicellulose derivative.

Seventh Embodiment

Next, each of resin compositions including a hemicellulose derivative and PMMA at different ratios was melted and kneaded in the extruder/kneader, and 3 kg of resin pellets was made of the kneaded resin composition. The hemicellulose derivative included acetonyl groups as R1 and R2. The acetonyl groups are described below. The hemicellulose derivative had a molecular weight (weight average molecular weight Mw) of 100,000. PMMA had a molecular weight (weight average molecular weight Mw) of 120,000.

[Chemical Formula 3]

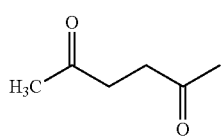

(化3)

In Example 51, resin pellets were made of a resin composition including 10 percent by weight of the hemicellulose derivative and 90 percent by weight of PMMA.

In Example 52, resin pellets were made of a resin composition including 20 percent by weight of the hemicellulose derivative and 80 percent by weight of PMMA.

In Example 53, resin pellets were made of a resin composition including 30 percent by weight of the hemicellulose derivative and 70 percent by weight of PMMA.

In Example 54, resin pellets were made of a resin composition including 40 percent by weight of the hemicellulose derivative and 60 percent by weight of PMMA.

In Example 55, resin pellets were made of a resin composition including 50 percent by weight of the hemicellulose derivative and 50 percent by weight of PMMA.

In Example 56, resin pellets were made of a resin composition including 60 percent by weight of the hemicellulose derivative and 40 percent by weight of PMMA.

In Example 57, resin pellets were made of a resin composition including 70 percent by weight of the hemicellulose derivative and 30 percent by weight of PMMA.

In Example 58, resin pellets were made of a resin composition including 80 percent by weight of the hemicellulose derivative and 20 percent by weight of PMMA.

In Example 59, resin pellets were made of a resin composition including 90 percent by weight of the hemicellulose derivative and 10 percent by weight of PMMA.

In Example 60, resin pellets were made of a resin composition including 100 percent by weight of the hemicellulose derivative including acetonyl groups as R1 and R2.

Samples of a dumbbell piece, a strip piece, a disk substrate, a cup, and a flat plate were produced from the 10 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 7.

weight (weight average molecular weight Mw) of 100,000. PMMA had a molecular weight (weight average molecular weight Mw) of 120,000.

In Example 61, resin pellets were made of a resin composition including 10 percent by weight of the hemicellulose derivative and 90 percent by weight of PMMA.

In Example 62, resin pellets were made of a resin composition including 20 percent by weight of the hemicellulose derivative and 80 percent by weight of PMMA.

In Example 63, resin pellets were made of a resin composition including 30 percent by weight of the hemicellulose derivative and 70 percent by weight of PMMA.

In Example 64, resin pellets were made of a resin composition including 40 percent by weight of the hemicellulose derivative and 60 percent by weight of PMMA.

In Example 65, resin pellets were made of a resin composition including 50 percent by weight of the hemicellulose derivative and 50 percent by weight of PMMA.

In Example 66, resin pellets were made of a resin composition including 60 percent by weight of the hemicellulose derivative and 40 percent by weight of PMMA.

TABLE 7

| EVALUATION ITEM | TARGET VALUE | SEVENTH EMBODIMENT | | | | | | | | | |
|---|---|---|---|---|---|---|---|---|---|---|---|
| | | 51 | 52 | 53 | 54 | 55 | 56 | 57 | 58 | 59 | 60 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| HEAT-RESISTANT TEMPERATURE (° C.) | 120° C. OR MORE | 122 | 127 | 200 | 252 | 252 | 206 | 182 | 171 | 171 | 180 |
| TENSILE STRENGTH (MPa) | 80 OR MORE | 82 | 84 | 95 | 99 | 99 | 95 | 91 | 90 | 89 | 91 |
| BENDING STRENGTH (MPa) | 150 OR MORE | 152 | 153 | 161 | 182 | 182 | 167 | 155 | 155 | 152 | 159 |
| FLUIDITY (g/10 min) | 15 OR MORE | 18 | 19 | 22 | 27 | 27 | 23 | 19 | 18 | 18 | 20 |
| TRANSCRIPTION PROPERTIES (nm) | 100 nm OR LESS | 89 | 89 | 59 | 48 | 48 | 54 | 59 | 69 | 69 | 64 |
| TOTAL LIGHT TRANSMITTANCE (%) | 92% OR MORE | 94 | 94 | 96 | 97 | 97 | 96 | 93 | 92 | 92 | 93 |
| BIREFRINGENCE PHASE DIFFERENCE (nm) | 30 nm OR LESS | 27 | 27 | 19 | 9 | 9 | 18 | 27 | 27 | 28 | 24 |
| METAL IMPURITY CONCENTRATION | 200 ppb OR LESS | 100 ppb | 100 ppb | 75 ppb | 40 ppb | 25 ppb | 25 ppb | 27 ppb | 20 ppb | 20 ppb | 20 ppb |
| BIODEGRADATION RATE (%) | 90% OR MORE | 91 | 92 | 96 | 100 | 100 | 99 | 95 | 95 | 98 | 100 |

While there are not large differences between the samples including 100 percent by weight of the hemicellulose derivative including acetyl groups as R1 and R2 and the sample including 100 percent by weight of the hemicellulose derivative including acetonyl groups as R1 and R2, the sample including 100 percent by weight of the hemicellulose derivative including acetonyl groups as R1 and R2 showed slightly better results. Also, the samples in Table 7 showed slightly better results in the respective evaluation items than those in Table 2 even if the ratio of PMMA is the same. Also, as in Table 2, the samples including 40% to 70 percent by weight of PMMA were excellent in heat-resistant temperature, tensile strength, bending strength, and biodegradation rate.

Eighth Embodiment

Next, each of resin compositions including a hemicellulose derivative and PMMA at different ratios was melted and kneaded in the extruder/kneader, and 3 kg of resin pellets was made of the kneaded resin composition. The hemicellulose derivative included carboxyl groups (—COOH) as R1 and R2. The hemicellulose derivative had a molecular In Example 67, resin pellets were made of a resin composition including 70 percent by weight of the hemicellulose derivative and 30 percent by weight of PMMA.

In Example 68, resin pellets were made of a resin composition including 80 percent by weight of the hemicellulose derivative and 20 percent by weight of PMMA.

In Example 69, resin pellets were made of a resin composition including 90 percent by weight of the hemicellulose derivative and 10 percent by weight of PMMA.

In Example 70, resin pellets were made of a resin composition including 100 percent by weight of the hemicellulose derivative including carboxyl groups as R1 and R2.

Samples of a dumbbell piece, a strip piece, a disk substrate, a cup, and a flat plate were produced from the 10 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 8.

TABLE 8

| EVALUATION ITEM | TARGET VALUE | EIGHTH EMBODIMENT | | | | | | | | | |
|---|---|---|---|---|---|---|---|---|---|---|
| | | 61 | 62 | 63 | 64 | 65 | 66 | 67 | 68 | 69 | 70 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| HEAT-RESISTANT TEMPERATURE (° C.) | 120° C. OR MORE | 121 | 127 | 200 | 251 | 251 | 206 | 182 | 171 | 171 | 180 |
| TENSILE STRENGTH(MPa) | 80 OR MORE | 82 | 84 | 94 | 99 | 99 | 95 | 91 | 90 | 89 | 91 |
| BENDING STRENGTH(MPa) | 150 OR MORE | 151 | 152 | 161 | 182 | 183 | 166 | 155 | 155 | 151 | 158 |
| FLUIDITY(g/10 min) | 15 OR MORE | 18 | 18 | 22 | 27 | 27 | 23 | 19 | 18 | 18 | 20 |
| TRANSCRIPTION PROPERTIES(nm) | 100 nm OR LESS | 90 | 90 | 58 | 49 | 49 | 56 | 59 | 69 | 69 | 64 |
| TOTAL LIGHT TRANSMITTANCE (%) | 92% OR MORE | 94 | 94 | 96 | 97 | 97 | 96 | 93 | 92 | 92 | 93 |
| BIREFRINGENCE PHASE DIFFERENCE(nm) | 30 nm OR LESS | 27 | 27 | 19 | 9 | 9 | 18 | 27 | 27 | 28 | 24 |
| METAL IMPURITY CONCENTRATION | 200 ppb OR LESS | 100 ppb | 100 ppb | 75 ppb | 40 ppb | 25 ppb | 25 ppb | 27 ppb | 20 ppb | 20 ppb | 20 ppb |
| BIODEGRADATION RATE(%) | 90% OR MORE | 91 | 92 | 95 | 100 | 100 | 99 | 95 | 95 | 97 | 100 |

While there are not large differences between the samples including 100 percent by weight of the hemicellulose derivative including acetyl groups as R1 and R2 and the samples including 100 percent by weight of the hemicellulose derivative including carboxyl groups as R1 and R2, the samples including 100 percent by weight of the hemicellulose derivative including carboxyl groups as R1 and R2 showed slightly better results. Also, the samples in Table 8 showed slightly better results in the respective evaluation items than those in Table 2 even if the ratio of PMMA is the same. Also, as in Table 2, the samples including 40% to 70 percent by weight of PMMA were excellent in heat-resistant temperature, tensile strength, bending strength, and biodegradation rate.

In summary, the samples including 100 percent by weight of the hemicellulose derivative including acetyl groups, the samples including 100 percent by weight of the hemicellulose derivative including acetonyl groups, and the samples including 100 percent by weight of the hemicellulose derivative including carboxyl groups showed better results in all the evaluation items than the conventional samples including 100 percent by weight of PLA. Also, the resin compositions including 30 to 60 percent by weight of the first resin, which is a hemicellulose derivative, and 40 to 70 percent by weight of the second resin are understood to have shown good results. Further, the resin compositions including 40 to 50 percent by weight of the first resin and 50 to 60 percent by weight of the second resin are understood to have shown better results.

Molded Products by Injection Molding (without Gas)

Ninth Embodiment

Injection-molded products were produced from resin pellets made of the resin compositions including the first resin and second resin described in the first to eighth embodiments (Examples 1 to 70).

Figure 1B:
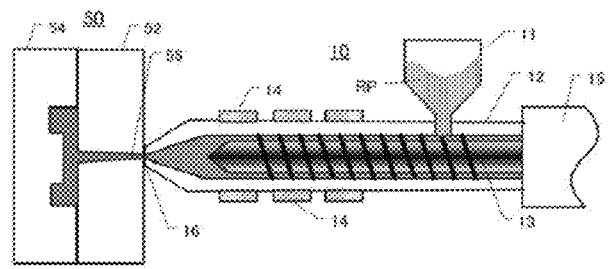
Figure 1C:
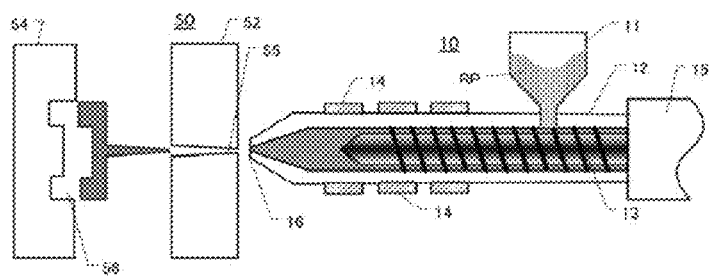

FIGS. 1A to 1C are concept drawings that show production of an injection-molded product using an injection molding machine 10 and a mold 50, in which FIG. 1A is a drawing that shows a state in which resin pellets RP made of a resin composition are being heated and liquidized in a resin injector; FIG. 1B is a drawing that shows a state in which the liquidized resin composition is being injected from the resin injector into a mold; and FIG. 1C is a drawing that shows a state in which the mold is being opened and a resin molded product is being extracted.

Configuration of Injection Molding Machine

The injection molding machine 10 includes a hopper 11 into which the resin pellets RP made of the resin composition are charged, a cylinder 12 into which the resin pellets RP are charged from the hopper 11, a rotatable screw 13 disposed in the cylinder 12, and heaters 14 disposed outside the cylinder 12. The screw 13 can be moved by a driver 15 in the direction toward the mold and the opposite direction thereof. The liquidized resin composition is injected from an end nozzle 16 of the cylinder 12.

The mold 50 includes a fixed mold 52 and a moving mold 54. When the fixed mold 52 and moving mold 54 closely contact each other, a cavity 56 is formed. The cavity 56 has a spool bush 55, which is a hole into which the liquidized resin composition is put.

Molding Method Using Injection Molding Machine

The resin pellets RP fall from the hopper 11 due to rotation of the screw 13 while being measured. The resin pellets RP are then melted (liquidized) by frictional heat caused by rotation and kneading of and by the screw 13 and the heat of the heaters 14. When the screw 13 is moved by the driver 15 in the direction toward the mold, the measured and liquidized resin composition is injected from the end nozzle 16 of the cylinder 12 to the cavity 56 through the spool bush 55 of the mold 50. The resin composition injected into the cavity 56 is cooled and solidified in the mold 50. Then, when the moving mold 54 is moved and the nozzle 16 of the injection molding machine 10 is released from the spool bush 55, a molded product MD is extracted. At this time, the molded product MD is extracted from the mold 50 due to self-fall or by an extractor (not shown).

As in the first to eighth embodiments, samples of a dumbbell piece, a strip piece, a disk substrate, a cup, and a flat plate were made of the molded product MD. The evaluation results of the samples are shown in Tables 9A (ninth embodiment part 1) to 9G (ninth embodiment part 7). Since these samples are molded products, the molding cycle time, molded product defect density, and molded product weight were newly added as evaluation items. On the other hand, the fluidity, birefringence phase difference, and impurity concentration were removed from the evaluation items.

Note that with respect to the resin compositions, Examples of the first and second embodiments correspond to Examples of the ninth embodiment part 1, Examples of the third embodiment correspond to Examples of the ninth embodiment part 2, Examples of the following embodiments correspond to Examples of the following parts of the ninth embodiment, and finally Examples of the eighth embodiment correspond to Examples of the ninth embodiment part 7.

TABLE 9A

| EVALUATION ITEM | TARGET VALUE | NINTH EMBODIMENT PART 1 | | | | | | | | | | COMPARATIVE EMBODIMENT | MEASUREMENT METHOD |
|---|---|---|---|---|---|---|---|---|---|---|---|---|---|
| | | 1 | 2 | 3 | 4 | 5 | 6 | 7 | 8 | 9 | 10 | | |
| HEMICELLULOSE | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME(s) | 8(s) OR LESS | 5 | 5 | 4 | 3 | 3 | 4 | 5 | 5 | 5 | 4 | 10 | MOLDING MACHINE |
| MOLDED PRODUCT DEFECT DENSITY(UNITS/cm2) | 100 OR LESS | 40 | 40 | 25 | 10 | 10 | 26 | 40 | 45 | 40 | 30 | 354 | KLA |
| MOLDED PRODUCT WEIGHT(g) | 18 g OR LESS | 17 | 17 | 16 | 15 | 15 | 16 | 17 | 17 | 18 | 17 | 19 | WEIGHING DEVICE |
| HEAT-RESISTANT TEMPERATURE(° C.) | 120° C. OR MORE | 121 | 126 | 201 | 250 | 250 | 205 | 180 | 170 | 170 | 180 | 58 | ISO75 |
| TENSILE STRENGTH(MPa) | 80 OR MORE | 81 | 83 | 94 | 98 | 98 | 94 | 90 | 90 | 88 | 90 | 63 | ISO527 |
| BENDING STRENGTH(MPa) | 150 OR MORE | 151 | 152 | 160 | 180 | 180 | 165 | 155 | 155 | 153 | 158 | 106 | ISO178 |
| TRANSCRIPTION PROPERTIES(nm) | 100 nm OR LESS | 90 | 90 | 60 | 50 | 50 | 55 | 60 | 70 | 70 | 65 | 500,000 nm | SEM |
| TOTAL LIGHT TRANSMITTANCE(%) | 92% OR MORE | 93 | 93 | 95 | 96 | 96 | 95 | 93 | 92 | 92 | 93 | 90 | ISO13468 |
| BIODEGRADATION RATE(%) | 90% OR MORE | 91 | 92 | 95 | 100 | 100 | 98 | 95 | 95 | 98 | 100 | 0% | ISO19679 |

TABLE 9B

| EVALUATION ITEM | TARGET VALUE | NINTH EMBODIMENT PART 2 | | | | | | | | |
|---|---|---|---|---|---|---|---|---|---|---|
| | | 11 | 12 | 13 | 14 | 15 | 16 | 17 | 18 | 19 |
| HEMICELLULOSE | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME(s) | 8(s) OR LESS | 4 | 4 | 3 | 2 | 2 | 3 | 4 | 4 | 5 |
| MOLDED PRODUCT DEFECT DENSITY(UNITS/cm2) | 100 OR LESS | 30 | 35 | 20 | 5 | 5 | 21 | 35 | 32 | 38 |
| MOLDED PRODUCT WEIGHT(g) | 18 g OR LESS | 17 | 17 | 16 | 15 | 15 | 16 | 17 | 17 | 18 |
| HEAT-RESISTANT TEMPERATURE(° C.) | 120° C. OR MORE | 126 | 129 | 210 | 260 | 260 | 240 | 190 | 175 | 175 |
| TENSILE STRENGTH(MPa) | 80 OR MORE | 82 | 84 | 95 | 99 | 99 | 94 | 91 | 91 | 89 |
| BENDING STRENGTH(MPa) | 150 OR MORE | 150 | 151 | 158 | 170 | 170 | 164 | 151 | 151 | 151 |
| TRANSCRIPTION PROPERTIES(nm) | 100 nm OR LESS | 85 | 85 | 50 | 40 | 40 | 45 | 50 | 60 | 60 |
| TOTAL LIGHT TRANSMITTANCE(%) | 92% OR MORE | 92 | 92 | 94 | 95 | 95 | 94 | 93 | 92 | 92 |
| BIODEGRADATION RATE(%) | 90% OR MORE | 92 | 93 | 96 | 100 | 100 | 96 | 95 | 95 | 94 |

TABLE 9C

| EVALUATION ITEM | TARGET VALUE | NINTH EMBODIMENT PART 3 ||||||||
|---|---|---|---|---|---|---|---|---|---|
| | | 22 | 23 | 24 | 25 | 26 | 27 | 28 | 29 |
| HEMICELLULOSE | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME(s) | 8(s) OR LESS | 6 | 6 | 5 | 4 | 4 | 5 | 6 | 6 | 6 |
| MOLDED PRODUCT DEFECT DENSITY(UNITS/cm2) | 100 OR LESS | 40 | 40 | 25 | 10 | 10 | 26 | 40 | 45 | 40 |
| MOLDED PRODUCT WEIGHT(g) | 18 g OR LESS | 17 | 17 | 16 | 15 | 15 | 16 | 17 | 17 | 18 |
| HEAT-RESISTANT TEMPERATURE(° C.) | 120° C. OR MORE | 120 | 121 | 140 | 150 | 150 | 145 | 130 | 130 | 130 |
| TENSILE STRENGTH(MPa) | 80 OR MORE | 81 | 83 | 85 | 86 | 86 | 88 | 85 | 85 | 84 |
| BENDING STRENGTH(MPa) | 150 OR MORE | 151 | 152 | 155 | 160 | 160 | 154 | 150 | 150 | 150 |
| TRANSCRIPTION PROPERTIES(nm) | 100 nm OR LESS | 500 | 450 | 100 | 90 | 90 | 80 | 100 | 100 | 100 |
| TOTAL LIGHT TRANSMITTANCE(%) | 92% OR MORE | 5 | 7 | 20 | 50 | 60 | 70 | 75 | 80 | 85 |
| BIODEGRADATION RATE(%) | 90% OR MORE | 90 | 91 | 95 | 100 | 100 | 95 | 95 | 95 | 97 |

TABLE 9D

| EVALUATION ITEM | TARGET VALUE | NINTH EMBODIMENT PART 4 ||||||||
|---|---|---|---|---|---|---|---|---|---|
| | | 31 | 32 | 33 | 34 | 35 | 36 | 37 | 38 | 39 |
| HEMICELLULOSE | — | 10 | 20 | 30 | 40 | 50 | 60 | 70 | 80 | 90 |
| PP | — | 90 | 80 | 70 | 60 | 50 | 40 | 30 | 20 | 10 |
| MOLDING CYCLE TIME(s) | 8(s) OR LESS | 5 | 5 | 3 | 2 | 2 | 3 | 5 | 5 | 5 |
| MOLDED PRODUCT DEFECT DENSITY(UNITS/cm2) | 100 OR LESS | 40 | 40 | 25 | 10 | 10 | 26 | 40 | 45 | 40 |
| MOLDED PRODUCT WEIGHT(g) | 18 g OR LESS | 17 | 17 | 16 | 15 | 15 | 16 | 17 | 17 | 18 |
| HEAT-RESISTANT TEMPERATURE(° C.) | 120° C. OR MORE | 122 | 128 | 210 | 250 | 250 | 210 | 190 | 160 | 160 |
| TENSILE STRENGTH(MPa) | 80 OR MORE | 80 | 80 | 88 | 91 | 91 | 92 | 85 | 85 | 84 |
| BENDING STRENGTH(MPa) | 150 OR MORE | 151 | 150 | 160 | 165 | 165 | 160 | 150 | 150 | 150 |
| TRANSCRIPTION PROPERTIES(nm) | 100 nm OR LESS | 500 | 500 | 98 | 90 | 90 | 96 | 100 | 100 | 95 |
| TOTAL LIGHT TRANSMITTANCE(%) | 92% OR MORE | 5 | 5 | 20 | 40 | 50 | 60 | 65 | 70 | 75 |
| BIODEGRADATION RATE(%) | 90% OR MORE | 92 | 92 | 96 | 100 | 100 | 97 | 97 | 97 | 98 |

TABLE 9E

| EVALUATION ITEM | TARGET VALUE | NINTH EMBODIMENT PART 5 ||||||||
|---|---|---|---|---|---|---|---|---|---|
| | | 41 | 42 | 43 | 44 | 45 | 46 | 47 | 48 | 49 |
| HEMICELLULOSE | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME(s) | 8(s) OR LESS | 6 | 5 | 4 | 2 | 2 | 4 | 5 | 6 | 6 |
| MOLDED PRODUCT DEFECT DENSITY(UNITS/cm2) | 100 OR LESS | 40 | 40 | 25 | 10 | 10 | 26 | 40 | 45 | 40 |
| MOLDED PRODUCT WEIGHT(g) | 18 g OR LESS | 17 | 17 | 16 | 15 | 15 | 16 | 17 | 17 | 18 |

TABLE 9E-continued

|  | TARGET VALUE | NINTH EMBODIMENT PART 5 | | | | | | | | |
|---|---|---|---|---|---|---|---|---|---|---|
| EVALUATION ITEM |  | 41 | 42 | 43 | 44 | 45 | 46 | 47 | 48 | 49 |
| HEAT-RESISTANT TEMPERATURE(° C.) | 120° C. OR MORE | 145 | 150 | 210 | 260 | 260 | 250 | 190 | 180 | 170 |
| TENSILE STRENGTH(MPa) | 80 OR MORE | 84 | 84 | 95 | 99 | 99 | 94 | 92 | 92 | 90 |
| BENDING STRENGTH(MPa) | 150 OR MORE | 160 | 165 | 170 | 190 | 190 | 160 | 155 | 150 | 152 |
| TRANSCRIPTION PROPERTIES(nm) | 100 nm OR LESS | 100 | 100 | 50 | 40 | 40 | 60 | 70 | 75 | 80 |
| TOTAL LIGHT TRANSMITTANCE(%) | 92% OR MORE | 92 | 93 | 94 | 95 | 95 | 94 | 92 | 92 | 92 |
| BIODEGRADATION RATE(%) | 90% OR MORE | 90 | 91 | 96 | 100 | 100 | 97 | 96 | 96 | 96 |

TABLE 9F

|  | TARGET VALUE | NINTH EMBODIMENT PART 6 | | | | | | | | | |
|---|---|---|---|---|---|---|---|---|---|---|---|
| EVALUATION ITEM |  | 51 | 52 | 53 | 54 | 55 | 56 | 57 | 58 | 59 | 60 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| MOLDING CYCLE TIME(s) | 8(s) OR LESS | 5 | 5 | 4 | 2 | 3 | 4 | 5 | 5 | 5 | 4 |
| MOLDED PRODUCT DEFECT DENSITY(UNITS/cm2) | 100 OR LESS | 45 | 40 | 20 | 10 | 5 | 20 | 40 | 45 | 40 | 30 |
| MOLDED PRODUCT WEIGHT(g) | 18 g OR LESS | 17 | 17 | 16 | 15 | 15 | 16 | 17 | 17 | 18 | 17 |
| HEAT-RESISTANT TEMPERATURE(° C.) | 120° C. OR MORE | 122 | 126 | 205 | 255 | 255 | 207 | 180 | 170 | 170 | 180 |
| TENSILE STRENGTH(MPa) | 80 OR MORE | 82 | 83 | 95 | 99 | 99 | 95 | 90 | 90 | 88 | 90 |
| BENDING STRENGTH(MPa) | 150 OR MORE | 151 | 151 | 165 | 185 | 185 | 170 | 160 | 155 | 153 | 158 |
| TRANSCRIPTION PROPERTIES(nm) | 100 nm OR LESS | 90 | 90 | 58 | 48 | 48 | 53 | 60 | 70 | 70 | 64 |
| TOTAL LIGHT TRANSMITTANCE(%) | 92% OR MORE | 93 | 93 | 96 | 97 | 97 | 96 | 93 | 92 | 92 | 93 |
| BIODEGRADATION RATE(%) | 90% OR MORE | 92 | 93 | 96 | 100 | 100 | 99 | 95 | 95 | 98 | 100 |

TABLE 9G

|  | TARGET VALUE | NINTH EMBODIMENT PART 7 | | | | | | | | | |
|---|---|---|---|---|---|---|---|---|---|---|---|
| EVALUATION ITEM |  | 61 | 62 | 63 | 64 | 65 | 66 | 67 | 68 | 69 | 70 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| MOLDING CYCLE TIME(s) | 8(s) OR LESS | 5 | 5 | 3 | 2 | 2 | 3 | 5 | 5 | 5 | 4 |
| MOLDED PRODUCT DEFECT DENSITY(UNITS/cm2) | 100 OR LESS | 45 | 40 | 22 | 8 | 5 | 20 | 40 | 45 | 40 | 30 |
| MOLDED PRODUCT WEIGHT(g) | 18 g OR LESS | 17 | 17 | 16 | 15 | 15 | 16 | 17 | 17 | 18 | 17 |
| HEAT-RESISTANT TEMPERATURE(° C.) | 120° C. OR MORE | 122 | 126 | 206 | 256 | 256 | 208 | 180 | 170 | 170 | 185 |
| TENSILE STRENGTH(MPa) | 80 OR MORE | 83 | 83 | 96 | 100 | 100 | 97 | 90 | 90 | 88 | 91 |
| BENDING STRENGTH(MPa) | 150 OR MORE | 151 | 151 | 166 | 187 | 187 | 172 | 160 | 155 | 153 | 159 |
| TRANSCRIPTION PROPERTIES(nm) | 100 nm OR LESS | 90 | 90 | 58 | 48 | 48 | 53 | 60 | 70 | 70 | 64 |
| TOTAL LIGHT TRANSMITTANCE(%) | 92% OR MORE | 93 | 93 | 96 | 97 | 97 | 96 | 93 | 92 | 92 | 93 |

TABLE 9G-continued

| | TARGET | NINTH EMBODIMENT PART 7 | | | | | | | | | |
|---|---|---|---|---|---|---|---|---|---|---|---|
| EVALUATION ITEM | VALUE | 61 | 62 | 63 | 64 | 65 | 66 | 67 | 68 | 69 | 70 |
| BIODEGRADATION RATE(%) | 90% OR MORE | 92 | 93 | 96 | 100 | 100 | 99 | 95 | 95 | 98 | 100 |

As is understood from a comparison between the first embodiment and Example 10 of the ninth embodiment, the samples including 100 percent by weight of the hemicellulose derivative including acetyl groups produced by light molding and the samples including 100 percent by weight of the hemicellulose derivative including acetyl groups produced by injection molding were the same in heat-resistant temperature, tensile strength, and the like.

As shown in the ninth embodiment part 1, the resin compositions including the first and second resins showed good results in the molding cycle time, molded product defect density, and molded product weight, which relate to injection molding, compared to the conventional resin composition including 100 percent by weight of PLA. Also, the resin compositions including 30 to 60 t by weight of the first resin and 40 to 70 percent by weight of the second resin are understood to have shown good results. Further, the resin compositions including 40 to 50 percent by weight of the first resin and 50 to 60 percent by weight of the second resin are understood to have shown better results. These resin compositions including the first resin and second resin has high biodegradability, which solves environmental problems and ocean contamination problems, and injection-molded products can be easily produced from these resin compositions.

Molded Products by Injection Molding (with Gas)

Tenth Embodiment

Injection-molded products were produced from resin pellets made of the resin compositions including the first and second resins described in the first to eighth embodiments (Examples 1 to 70). Unlike in the ninth embodiment, in a tenth embodiment, an inert gas is supplied to at least one of the injection molding machine 10 and mold 50.

Figure 2A:
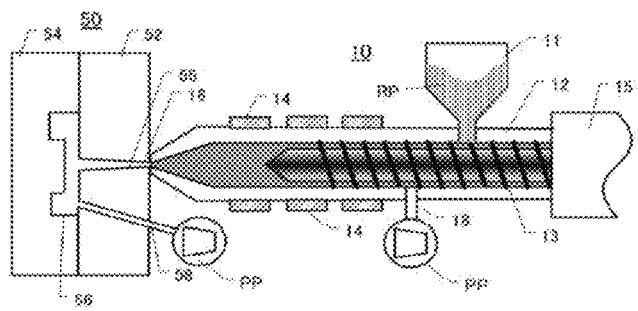
FIGS. 2A to 2C are concept drawings that show production of an injection-molded product using an injection molding machine and a mold (with a gas).
Figure 2B:
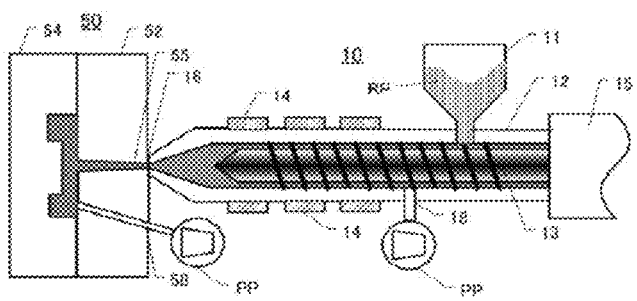
Figure 2C:
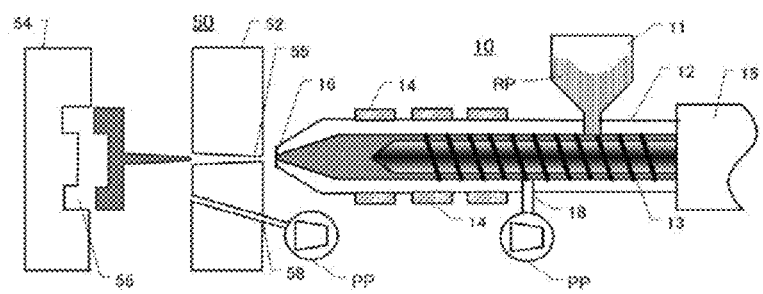

FIGS. 2A to 2C are concept drawings that show production of an injection-molded product using an injection molding machine 10 and a mold 50, in which FIG. 2A is a drawing that shows a state in which resin pellets made of the resin composition are being heated and liquidized in a resin injector; FIG. 2B is a drawing that shows a state in which the liquidized resin composition is being injected from the resin injector to mold portions; and FIG. 2C is a drawing that shows a state in which the mold portions are being opened and a resin molded product is being extracted.

Configuration of Injection Molding Machine

The same members as those of the injection molding machine 10 and mold 50 shown in FIGS. 1A to 1C are assigned the same reference signs. The differences between FIGS. 2A to 2C and FIGS. 1A to 1C will be described, and the same reference signs will not be described. A cylinder 12 is provided with a gas supply tube 18 connected to a pump PP. The mold 50 is provided a gas supply tube 58 to which the pump PP is connected. The pump PP supplies an inert gas or the like to the liquidized resin composition. Thus, a formed molded product is obtained. Note that the gas supply tube for supplying an inert gas or the like to the liquidized resin composition only has to be provided on at least one of the injection molding machine 10 and mold 50.

Examples of the foaming gas include inert gases typified by noble gases, such as nitrogen, helium, and argon, carbon dioxide, which is easily dissolved in thermoplastic resins and shows good plasticizer effects, chlorofluorocarbons obtained by substituting fluorine for C1 to C5 saturated hydrocarbon or part thereof, and vapor of liquid, such as water or alcohol. In the present embodiment, carbon dioxide was used as the foaming gas.

Molding Method Using Injection Molding Machine

The following molding method is a method in which a gas is supplied to both the liquidized resin composition in the injection molding machine 10 and that in the mold 50.

Resin pellets RP fall from a hopper 11 due to rotation of a screw 13 while being measured. The resin pellets RP are then melted (liquidized) by frictional heat caused by rotation and kneading of and by the screw 13 and the heat of heaters 14. The gas is introduced from the pump PP into the liquidized resin composition and dispersed in the liquid. When the screw 13 is moved by a driver 15 in the direction toward the mold, the gas-dispersed resin composition is injected from an end nozzle 16 of the cylinder 12 into a cavity 56 through a spool bush 55 of the mold 50.

Subsequently, the gas is introduced from the pump PP into the liquidized resin composition in the cavity 56 and dispersed in the liquid. The gas-containing resin composition is then cooled and solidified in the mold 50. Then, when the moving mold 54 is moved and the nozzle 16 of the injection molding machine 10 is released from the spool bush 55, a molded product MD is extracted. At this time, the molded product MD is extracted from the mold 50 due to self-fall or by an extractor (not shown).

As in the first to eighth embodiments, samples of a dumbbell piece, a strip piece, a disk substrate, a cup, and a flat plate were produced from the molded product MD. The evaluation results of the samples are shown in Tables 10A (tenth embodiment part 1) to 10G (tenth embodiment part 7).

TABLE 10A

| EVALUATION ITEM | TARGET VALUE | TENTH EMBODIMENT PART 1 | | | | | | | | | | COMPARATIVE EMBODIMENT | MEASUREMENT METHOD |
|---|---|---|---|---|---|---|---|---|---|---|---|---|---|
| | | 1 | 2 | 3 | 4 | 5 | 6 | 7 | 8 | 9 | 10 | | |
| HEMICELLULOSE | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE | 8(s) OR | 4 | 4 | 3 | 2 | 2 | 3 | 4 | 4 | 4 | 3 | 9 | MOLDING |

TABLE 10A-continued

| EVALUATION ITEM | TARGET VALUE | TENTH EMBODIMENT PART 1 | | | | | | | | | | COMPARATIVE EMBODIMENT | MEASUREMENT METHOD |
|---|---|---|---|---|---|---|---|---|---|---|---|---|---|
| | | 1 | 2 | 3 | 4 | 5 | 6 | 7 | 8 | 9 | 10 | | |
| TIME(s) | LESS | | | | | | | | | | | | MACHINE |
| MOLDED PRODUCT DEFECT DENSITY(UNITS/cm2) | 100 OR LESS | 38 | 38 | 20 | 8 | 8 | 19 | 39 | 42 | 38 | 28 | 567 | KLA |
| MOLDED PRODUCT WEIGHT(g) | 18 g OR LESS | 14 | 14 | 12 | 11 | 11 | 12 | 13 | 14 | 14 | 15 | 18 | WEIGHING DEVICE |
| HEAT-RESISTANT TEMPERATURE(° C.) | 120° C. OR MORE | 150 | 155 | 220 | 280 | 280 | 220 | 190 | 180 | 180 | 190 | 62 | ISO75 |
| TENSILE STRENGTH(MPa) | 80 OR MORE | 85 | 85 | 96 | 100 | 100 | 97 | 94 | 94 | 95 | 90 | 59 | ISO527 |
| BENDING STRENGTH(MPa) | 150 OR MORE | 160 | 161 | 170 | 190 | 190 | 175 | 161 | 161 | 160 | 160 | 90 | ISO178 |
| TRANSCRIPTION PROPERTIES(nm) | 100 nm OR LESS | 70 | 70 | 40 | 30 | 30 | 40 | 50 | 70 | 70 | 60 | 500,000 nm | SEM |
| TOTAL LIGHT TRANSMITTANCE(%) | 92% OR MORE | 94 | 94 | 96 | 98 | 98 | 96 | 94 | 94 | 94 | 95 | 90 | ISO13468 |
| BIODEGRADATION RATE(%) | 90% OR MORE | 93 | 94 | 98 | 100 | 100 | 99 | 97 | 97 | 99 | 100 | 0% | ISO19679 |

TABLE 10B

| EVALUATION ITEM | TARGET VALUE | TENTH EMBODIMENT PART 2 | | | | | | | | |
|---|---|---|---|---|---|---|---|---|---|---|
| | | 11 | 12 | 13 | 14 | 15 | 16 | 17 | 18 | 19 |
| HEMICELLULOSE | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME(s) | 8(s) OR LESS | 3 | 3 | 2 | 2 | 2 | 2 | 3 | 3 | 4 |
| MOLDED PRODUCT DEFECT DENSITY(UNITS/cm2) | 100 OR LESS | 25 | 30 | 17 | 3 | 3 | 16 | 30 | 30 | 32 |
| MOLDED PRODUCT WEIGHT(g) | 18 g OR LESS | 15 | 15 | 14 | 13 | 13 | 14 | 16 | 16 | 17 |
| HEAT-RESISTANT TEMPERATURE(° C.) | 120° C. OR MORE | 130 | 132 | 215 | 270 | 270 | 245 | 200 | 185 | 180 |
| TENSILE STRENGTH(MPa) | 80 OR MORE | 90 | 90 | 100 | 104 | 104 | 102 | 93 | 94 | 94 |
| BENDING STRENGTH(MPa) | 150 OR MORE | 152 | 154 | 167 | 174 | 174 | 170 | 154 | 155 | 154 |
| TRANSCRIPTION PROPERTIES(nm) | 100 nm OR LESS | 60 | 60 | 40 | 30 | 30 | 38 | 45 | 55 | 55 |
| TOTAL LIGHT TRANSMITTANCE(%) | 92% OR MORE | 94 | 94 | 95 | 96 | 96 | 95 | 94 | 94 | 94 |
| BIODEGRADATION RATE(%) | 90% OR MORE | 93 | 94 | 97 | 100 | 100 | 98 | 96 | 97 | 96 |

TABLE 10C

| EVALUATION ITEM | TARGET VALUE | TENTH EMBODIMENT PART 3 | | | | | | | | |
|---|---|---|---|---|---|---|---|---|---|---|
| | | 21 | 22 | 23 | 24 | 25 | 26 | 27 | 28 | 29 |
| HEMICELLULOSE | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME(s) | 8(s) OR LESS | 5 | 5 | 4 | 3 | 3 | 4 | 5 | 5 | 5 |
| MOLDED PRODUCT DEFECT DENSITY(UNITS/cm2) | 100 OR LESS | 35 | 35 | 23 | 8 | 8 | 20 | 30 | 35 | 35 |
| MOLDED PRODUCT WEIGHT(g) | 18 g OR LESS | 15 | 15 | 14 | 13 | 13 | 14 | 15 | 15 | 16 |
| HEAT-RESISTANT TEMPERATURE(° C.) | 120° C. OR MORE | 125 | 125 | 150 | 165 | 165 | 150 | 140 | 140 | 142 |
| TENSILE STRENGTH(MPa) | 80 OR MORE | 84 | 85 | 93 | 95 | 95 | 93 | 86 | 86 | 85 |
| BENDING | 150 OR | 155 | 155 | 165 | 170 | 170 | 165 | 155 | 155 | 155 |

TABLE 10C-continued

|  | TARGET | TENTH EMBODIMENT PART 3 | | | | | | | | |
|---|---|---|---|---|---|---|---|---|---|---|
| EVALUATION ITEM | VALUE | 21 | 22 | 23 | 24 | 25 | 26 | 27 | 28 | 29 |
| STRENGTH(MPa) | MORE | | | | | | | | | |
| TRANSCRIPTION PROPERTIES(nm) | 100 nm OR LESS | 400 | 350 | 85 | 70 | 70 | 75 | 90 | 90 | 95 |
| TOTAL LIGHT TRANSMITTANCE(%) | 92% OR MORE | 5 | 7 | 21 | 50 | 61 | 68 | 76 | 80 | 83 |
| BIODEGRADATION RATE(%) | 90% OR MORE | 90 | 91 | 95 | 100 | 100 | 95 | 95 | 95 | 97 |

TABLE 10D

|  | TARGET | TENTH EMBODIMENT PART 5 | | | | | | | | |
|---|---|---|---|---|---|---|---|---|---|---|
| EVALUATION ITEM | VALUE | 41 | 42 | 43 | 44 | 45 | 46 | 47 | 48 | 49 |
| HEMICELLULOSE | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME(s) | 8(s) OR LESS | 5 | 4 | 3 | 1 | 1 | 3 | 4 | 5 | 5 |
| MOLDED PRODUCT DEFECT DENSITY(UNITS/cm2) | 100 OR LESS | 30 | 30 | 20 | 4 | 3 | 18 | 30 | 35 | 30 |
| MOLDED PRODUCT WEIGHT(g) | 18 g OR LESS | 15 | 15 | 14 | 13 | 13 | 14 | 15 | 15 | 15 |
| HEAT-RESISTANT TEMPERATURE(° C.) | 120° C. OR MORE | 150 | 160 | 220 | 270 | 270 | 260 | 200 | 185 | 180 |
| TENSILE STRENGTH(MPa) | 80 OR MORE | 90 | 90 | 105 | 110 | 110 | 100 | 98 | 98 | 98 |
| BENDING STRENGTH(MPa) | 150 OR MORE | 170 | 175 | 190 | 200 | 200 | 180 | 175 | 175 | 175 |
| TRANSCRIPTION PROPERTIES(nm) | 100 nm OR LESS | 90 | 90 | 35 | 20 | 20 | 35 | 60 | 65 | 70 |
| TOTAL LIGHT TRANSMITTANCE(%) | 92% OR MORE | 93 | 94 | 96 | 97 | 97 | 96 | 94 | 94 | 94 |
| BIODEGRADATION RATE(%) | 90% OR MORE | 93 | 94 | 98 | 100 | 100 | 98 | 97 | 97 | 98 |

TABLE 10E

|  | TARGET | TENTH EMBODIMENT PART 5 | | | | | | | | |
|---|---|---|---|---|---|---|---|---|---|---|
| EVALUATION ITEM | VALUE | 41 | 42 | 43 | 44 | 45 | 46 | 47 | 48 | 49 |
| HEMICELLULOSE | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME(s) | 8(s) OR LESS | 5 | 4 | 3 | 1 | 1 | 3 | 4 | 5 | 5 |
| MOLDED PRODUCT DEFECT DENSITY(UNITS/cm2) | 100 OR LESS | 30 | 30 | 20 | 4 | 3 | 18 | 30 | 35 | 30 |
| MOLDED PRODUCT WEIGHT(g) | 18 g OR LESS | 15 | 15 | 14 | 13 | 13 | 14 | 15 | 15 | 15 |
| HEAT-RESISTANT TEMPERATURE(° C.) | 120° C. OR MORE | 150 | 160 | 220 | 270 | 270 | 260 | 200 | 185 | 180 |
| TENSILE STRENGTH(MPa) | 80 OR MORE | 90 | 90 | 105 | 110 | 110 | 100 | 98 | 98 | 98 |
| BENDING STRENGTH(MPa) | 150 OR MORE | 170 | 175 | 190 | 200 | 200 | 180 | 175 | 175 | 175 |
| TRANSCRIPTION PROPERTIES(nm) | 100 nm OR LESS | 90 | 90 | 35 | 20 | 20 | 35 | 60 | 65 | 70 |
| TOTAL LIGHT TRANSMITTANCE(%) | 92% OR MORE | 93 | 94 | 96 | 97 | 97 | 96 | 94 | 94 | 94 |
| BIODEGRADATION RATE(%) | 90% OR MORE | 93 | 94 | 98 | 100 | 100 | 98 | 97 | 97 | 98 |

TABLE 10F

| EVALUATION ITEM | TARGET VALUE | TENTH EMBODIMENT PART 6 | | | | | | | | | |
|---|---|---|---|---|---|---|---|---|---|---|---|
| | | 51 | 52 | 53 | 54 | 55 | 56 | 57 | 58 | 59 | 60 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| MOLDING CYCLE TIME(s) | 8(s) OR LESS | 4 | 4 | 2 | 1 | 1 | 2 | 4 | 4 | 4 | 3 |
| MOLDED PRODUCT DEFECT DENSITY(UNITS/cm2) | 100 OR LESS | 37 | 37 | 19 | 7 | 7 | 18 | 38 | 40 | 37 | 28 |
| MOLDED PRODUCT WEIGHT(g) | 18 g OR LESS | 14 | 14 | 12 | 11 | 11 | 12 | 13 | 14 | 14 | 15 |
| HEAT-RESISTANT TEMPERATURE(° C.) | 120° C. OR MORE | 151 | 156 | 225 | 285 | 285 | 225 | 190 | 180 | 180 | 190 |
| TENSILE STRENGTH(MPa) | 80 OR MORE | 85 | 85 | 96 | 100 | 100 | 97 | 94 | 94 | 95 | 90 |
| BENDING STRENGTH(MPa) | 150 OR MORE | 160 | 161 | 170 | 190 | 190 | 175 | 161 | 161 | 160 | 160 |
| TRANSCRIPTION PROPERTIES(nm) | 100 nm OR LESS | 69 | 68 | 38 | 25 | 25 | 35 | 47 | 65 | 65 | 50 |
| TOTAL LIGHT TRANSMITTANCE(%) | 92% OR MORE | 94 | 94 | 96 | 98 | 98 | 96 | 94 | 94 | 94 | 95 |
| BIODEGRADATION RATE(%) | 90% OR MORE | 93 | 94 | 98 | 100 | 100 | 99 | 97 | 97 | 99 | 100 |

TABLE 10G

| EVALUATION ITEM | TARGET VALUE | TENTH EMBODIMENT PART 7 | | | | | | | | | |
|---|---|---|---|---|---|---|---|---|---|---|---|
| | | 61 | 62 | 63 | 64 | 65 | 66 | 67 | 68 | 69 | 70 |
| HEMICELLULOSE | — | 10 | 20 | 30 | 40 | 50 | 60 | 70 | 80 | 90 | 100 |
| PMMA | — | 90 | 80 | 70 | 60 | 50 | 40 | 30 | 20 | 10 | 0 |
| MOLDING CYCLE TIME(s) | 8(s) OR LESS | 4 | 4 | 2 | 1 | 1 | 2 | 4 | 4 | 4 | 3 |
| MOLDED PRODUCT DEFECT DENSITY(UNITS/cm2) | 100 OR LESS | 38 | 38 | 18 | 6 | 6 | 18 | 38 | 40 | 37 | 27 |
| MOLDED PRODUCT WEIGHT(g) | 18 g OR LESS | 14 | 14 | 12 | 11 | 11 | 12 | 14 | 14 | 14 | 15 |
| HEAT-RESISTANT TEMPERATURE(° C.) | 120° C. OR MORE | 151 | 156 | 224 | 284 | 286 | 228 | 190 | 180 | 180 | 195 |
| TENSILE STRENGTH(MPa) | 80 OR MORE | 85 | 85 | 97 | 101 | 101 | 98 | 94 | 94 | 95 | 90 |
| BENDING STRENGTH(MPa) | 150 OR MORE | 160 | 161 | 175 | 191 | 191 | 179 | 161 | 161 | 160 | 162 |
| TRANSCRIPTION PROPERTIES(nm) | 100 nm OR LESS | 69 | 68 | 35 | 20 | 20 | 35 | 45 | 65 | 65 | 50 |
| TOTAL LIGHT TRANSMITTANCE(%) | 92% OR MORE | 94 | 94 | 97 | 98 | 98 | 97 | 94 | 94 | 94 | 95 |
| BIODEGRADATION RATE(%) | 90% OR MORE | 93 | 94 | 99 | 100 | 100 | 99 | 97 | 97 | 98 | 100 |

As is understood from a comparison between Example 10 of the ninth embodiment and Example 10 of the tenth embodiment, the samples including 100 percent by weight of the hemicellulose derivative including acetyl groups produced by foam injection molding were better not only in the injection molding-related evaluation items, such as the molding cycle time, but also in the items, such as heat-resistant temperature and tensile strength, than the samples including 100 percent by weight of the hemicellulose derivative including acetyl groups produced by injection molding. Also, the samples including 30 to 60 t by weight of the first resin and 40 to 70 percent by weight of the second resin are understood to have shown good results. Further, samples including 40 to 50 percent by weight of the first resin and 50 to 60 percent by weight of the second resin are understood to have shown better results.

Also, as is understood from a comparison between Tables of the ninth embodiment (parts 1 to 7) and Tables of the tenth embodiment (parts 1 to 7), all the samples including PMMA, PC, PE, PP, or PET as the second resin showed higher performance in the molding cycle time, molded product defect density, molded product weight, heat-resistant temperature, tensile strength, bending strength, transcription properties, total light transmittance, and biodegradation rate. From the results, it is particularly preferred to mold the resin composition according to the present embodiment using the foam injection molding method using a gas.

While it has not been described as an embodiment, there is a technology that performs foam injection molding while supplying a foaming agent from the hopper along with resin pellets. It can be predicted that even if a foaming agent is supplied from the hopper, the resin composition of the present embodiment will show higher performance. Also, resin pellets including a foaming agent may be supplied. Also, the foaming gas to be supplied into the resin pellets may be an inert gas typified by noble gases, such as nitrogen, helium, and argon, carbon dioxide, which is easily dissolved in thermoplastic resins and shows good plasticizer effects, a gas obtained by substituting fluorine for C1 to C5 saturated hydrocarbon or part thereof, or the like.

The invention claimed is:

1. A resin composition for molding, comprising a first resin that is derived from a plant having the structure of Formula 1:

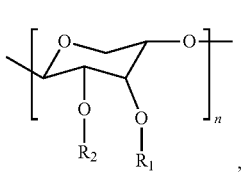

(化1)

wherein:
each of R1 and R2 is independently selected from an alkyl group; and
n is an integer equal to or greater than 2.

2. The resin composition for molding of claim 1, further comprising a second resin that is polymethylmethacrylate (PMMA), wherein
the first resin and the second resin are mixed at a molecular level.

3. The resin composition for molding of claim 1, further comprising a second resin including one of polycarbonate (PC), cyclo olefin polymer (COP), cyclo olefin copolymer (COC), polypropylene (PP), polyethylene (PE), polyethylene terephthalate (PET), polystyrene (PS), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (TFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polytetrafluoroethylene (PTFE), FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), wood powder, wood pellets, bamboo powder, bamboo pellets, grass powder, grass pellets, and paper powder, wherein
the first resin and the second resin are mixed at a molecular level.

4. The resin composition for molding of claim 2, wherein the resin composition comprises 30 to 60 percent by weight of the first resin and 40 to 70 percent by weight of the second resin.

5. The resin composition of claim 2, wherein
the resin composition comprises 40 to 50 percent by weight of the first resin and 50 to 60 percent by weight of the second resin.

6. The resin composition for molding of claim 3, wherein the resin composition comprises 30 to 60 percent by weight of the first resin and 40 to 70 percent by weight of the second resin.

7. The resin composition of claim 3, wherein
the resin composition comprises 40 to 50 percent by weight of the first resin and 50 to 60 percent by weight of the second resin.

8. A resin composition for molding, comprising a first resin that is derived from a plant having the structure of Formula 1:

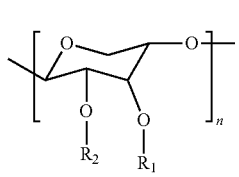

(化1)

wherein:
each of $R_1$ and $R_2$ is independently selected from an alkyl group and a carbonyl group; and
n represents an integer equal to or greater than 2; and
a second resin including one of polymethylmethacrylate (PMMA), polycarbonate (PC), cyclo olefin polymer (COP), cyclo olefin copolymer (COC), polypropylene (PP), polyethylene (PE), polyethylene terephthalate (PET), polystyrene (PS), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (TFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polytetrafluoroethylene (PTFE), FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), wood powder, wood pellets, bamboo powder, bamboo pellets, grass powder, grass pellets, and paper powder; wherein
the first resin and the second resin are mixed at a molecular level.

9. The resin composition for molding of claim 8, wherein the resin composition comprises 30 to 60 percent by weight of the first resin and 40 to 70 percent by weight of the second resin.

10. The resin composition of claim 8, wherein
the resin composition comprises 40 to 50 percent by weight of the first resin and 50 to 60 percent by weight of the second resin.

11. The resin composition of claim 8, wherein the first resin is obtained by removing water and functions as a solvent when melted.

12. The resin composition of claim 8, wherein the resin composition is capable of use in light molding and injection molding.

13. The resin composition of claim 1, wherein the resin composition is capable of use in light molding and injection molding.

* * * * *